United States Patent
Dubuque

(10) Patent No.: US 7,047,425 B2
(45) Date of Patent: May 16, 2006

(54) SCALEABLE MUTI-LEVEL SECURITY METHOD IN OBJECT ORIENTED OPEN NETWORK SYSTEMS

(75) Inventor: Mark W. Dubuque, Town & Country, MO (US)

(73) Assignee: The Boeing Company

( * ) Notice: Subject to any disclaimer, the term of this patent is extended or adjusted under 35 U.S.C. 154(b) by 252 days.

(21) Appl. No.: 10/198,862

(22) Filed: Jul. 19, 2002

(65) Prior Publication Data

US 2004/0015720 A1    Jan. 22, 2004

(51) Int. Cl.
*H04L 9/00* (2006.01)
*G06F 15/173* (2006.01)
*G06F 15/16* (2006.01)

(52) U.S. Cl. ............... 713/200; 713/201; 713/160; 713/161; 709/225; 709/227; 709/229

(58) Field of Classification Search ........ 713/200–202, 713/168, 155, 160, 161; 709/225, 227, 229
See application file for complete search history.

(56) References Cited

U.S. PATENT DOCUMENTS 5,621,733 A * 4/1997 Rooth ..................... 370/392
6,178,505 B1 * 1/2001 Schneider et al. .......... 713/168

* cited by examiner

*Primary Examiner*—Matthew Smithers
*Assistant Examiner*—Courtney D. Fields
(74) *Attorney, Agent, or Firm*—Black Lowe & Graham PLLC

(57) ABSTRACT

A system and method are provided for securely transferring data between applications over a network. According to one embodiment, a receive site address on a server is selected based on a first IP address/object filter table and a desired security level. A data payload for transmittal is defined the data payload is encrypted for transfer and the encrypted data payload is transmitted from a send site address over a network to the receive site address. The transmitted encrypted data is only received at the receive site address by decrypting the data payload and accepting the data based upon a second IP filter table and the address of the send site.

23 Claims, 5 Drawing Sheets

SCALEABLE MUTI-LEVEL SECURITY METHOD IN OBJECT ORIENTED OPEN NETWORK SYSTEMS

FIELD OF THE INVENTION

This invention relates generally to computer networks and, more specifically, to computer network security.

BACKGROUND OF THE INVENTION

Data is a pervasive concept. Networks carry data comprising anything from voice communication, to video images, to high-level calculation results. Transfer of data across networks has supplanted the use of common office fixtures such as the telephone and fax machine. Networks have become the backbone of business communication.

The database paradigm has been the basis of a revolutionary concept in computer program development, that is the use of packaged groups of executable code and accompanying data. To invoke an object is to perform an operation on it, the invocation resulting in another data object. Unlike the "series of verbs" programming style, Object Oriented Programming ("OOP") is organized around "Objects" rather than "Actions"—data rather than logic.

Historically, computer programs have manipulated data according to a paradigm that views the logical procedure that it takes to input data, process it, and produce output data. Programming, then, became a long vulnerable chain of interdependent manipulations of the data. Changing a single step often required re-drafting elaborate subroutines. Object oriented programming tends to package objects by defining the data it contains and any logical sequences that can manipulate that data.

Common Object Request Broker Architecture (CORBA) takes the logic one step further. If every computer platform in a network is standardized by a series of software drivers such that a logical operation performed on an object has the same result regardless of which platform performs the manipulation, tying multiple platforms onto a single network is easily accomplished. In CORBA, standard off-the-shelf computer programs written in one language or another are wrapped with software making them objects. Invocation with a standard call to the wrapped software results in a standardized response, even if the program would not so respond in its native environment. While the program acts as though it is on its normal platform, it looks to the CORBA operating system like just another of its objects.

Objects exist on a network. The network is a series of computational platforms communicatively tied together. Invocation of an object on the network evokes the same response, regardless of which platform in the network invoked the object. Sending and receiving those objects on the network facilitates the use of those objects by any of the several platforms within the network. Thus, the CORBA standard allows for a powerful network with diverse platforms.

As defined, any platform in the network that has access to the objects can perform the manipulations of data. However, the network strength is also its weakness. Any platform on the network can invoke an object and either publish or modify the data it finds therein. In a closed network among trusted platforms, the need for security of the objects is not as pronounced as on an open network. To span great distances, to access the Internet, or to provide access at remote locations, a network must be open. The dichotomy is pervasive. The more accessible the network is, the more useful it is. To that end, a security system is necessary to protect the objects in an object-oriented network.

Where access to a network either cannot or is presumed not to be controlled reliably, an alternate means of securing data within the system is needed. There exists, therefore, an unmet need in the art for imposing security on an object-oriented network without impairing the network's accessibility.

SUMMARY OF THE INVENTION

A system and method are provided for securely transferring data between applications over a network. According to one embodiment, a receive site address on a server is selected based on a first IP address/object filter table and a desired security level. A data payload for transmittal is defined the data payload is encrypted for transfer and the encrypted data payload is transmitted from a send site address over a network to the receive site address. The transmitted encrypted data is only received at the receive site address by decrypting the data payload and accepting the data based upon a second IP filter table and the address of the send site.

Object and socket filters act as a pass/no-pass gauge indicating whether data will be used in the system. If data comes from an expected site invoked by the appropriate application, the filter indicates that the data is reliable. Because the filter table can be dynamically changed, data is only reliable while it is "hot." Where an application or platform requests data from an address that is not reliable according to the filter table, that interaction provides a trackable breach of security. Thus, the filters provide information for monitoring and recording attacks. The filter could also use typical dynamic IP switching techniques as a response to attack or as a way to prevent monitoring.

Multiple filters can be used to provide multiple levels of security. Thus, within a certain filter table, designations of IP addresses may have greater or lesser tolerance or may be changed with greater or lesser frequency in order to effect security. By the same token, distinct groups on a network may have distinct filter tables thereby allowing each security independent of the others. A breach of one will not constitute a breach of the several others that are operating on the same network.

Further, the present invention does not necessarily require a large computing overhead. Designation of safe sites on a network does not entail the use of lengthy algorithms. Thus, the addition to standard encryption has a negligible impact on the overall load. For this same reason, the invention yields very good security even when implemented with processors with limited capability, such as those on board an unmanned drone, or even a handheld PDA.

BRIEF DESCRIPTION OF THE DRAWINGS

The preferred and alternative embodiments of the present invention are described in detail below with reference to the following drawings.

DETAILED DESCRIPTION OF THE INVENTION

A system and method are provided for securely transferring data between applications over a network. According to one embodiment, a receive site address on a server is selected based on a first IP address/object filter table and a desired security level. A data payload for transmittal is defined the data payload is encrypted for transfer and the encrypted data payload is transmitted from a send site address over a network to the receive site address. The transmitted encrypted data is only received at the receive site address by decrypting the data payload and accepting the data based upon a second IP filter table and the address of the send site.

The following discussion is intended to provide a general description of a suitable computing environment in which the invention may be implemented. The invention facilitates secure interaction between a personal computer or client in connection with a server between clients, or between clients, or between networks, or any combination thereof. Those skilled in the art will recognize that the invention may also be implemented in combination with other network configurations. Generally, an embodiment of the invention wraps program modules including routines, operating systems, application programs, components, data structures, etc., that perform read/write tasks or implement particular abstract data modifications or transmittals. Moreover, those skilled in the art will appreciate that the invention may be practiced with other computer system configurations including hand-held devices, multi-processor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in the relationship between clients and server. Examples of such distributed computer environments include local area networks of an office, enterprise-wide computer networks, wireless networks, and the Internet. So long as there exists an appropriate means to synchronize the filter tables that are described below, any communications network will serve.

Figure 1:
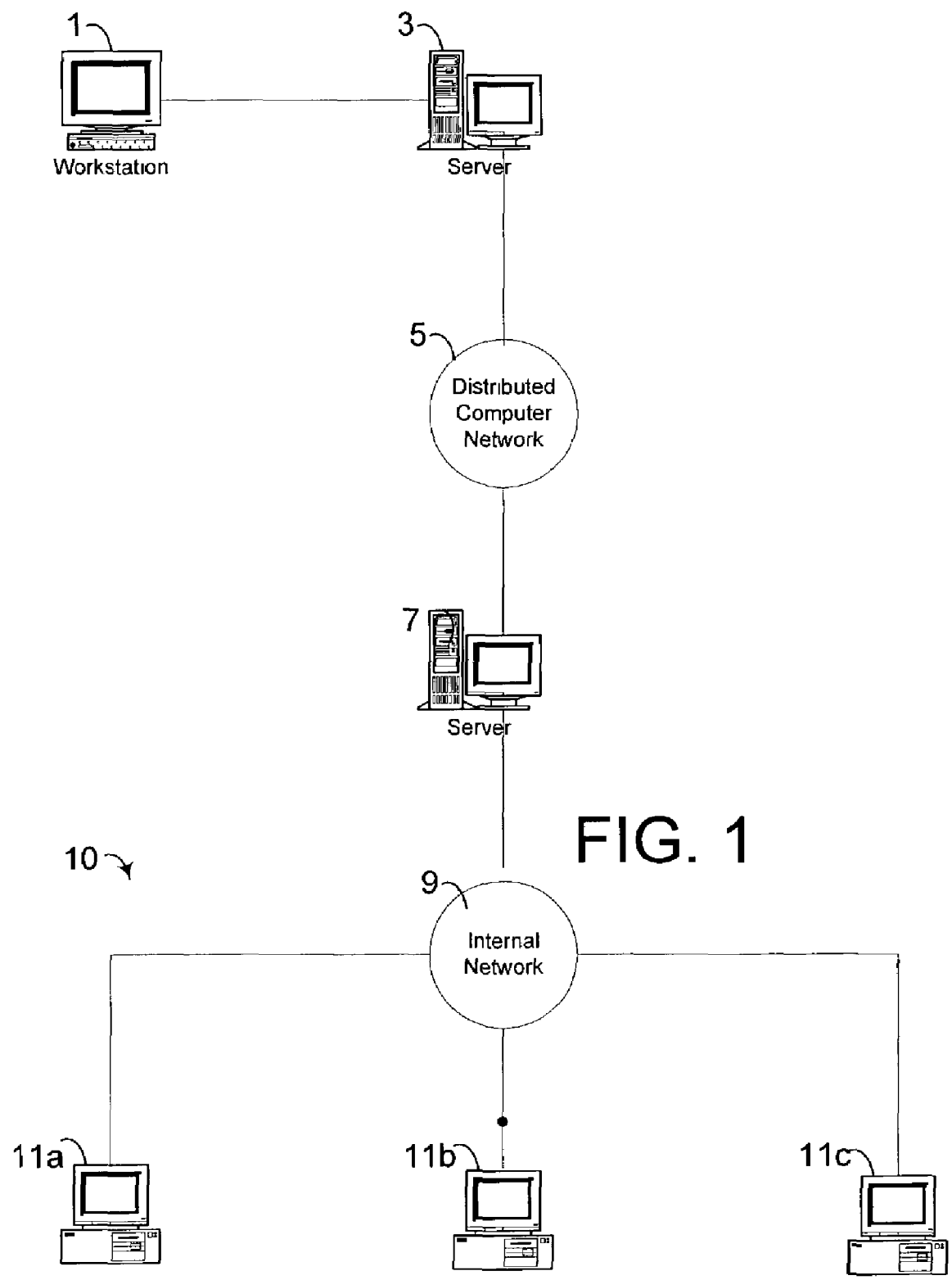
FIG. 1 shows an exemplary network.

FIG. 1 illustrates a typical client-to-server environment 10 in which an exemplary embodiment of the present invention operates. A computer system or client 1, such as without limitation, a conventional personal computer or any device operable to communicate over a network, is connected to a network server 3. The server 3 is generally provided in the context of the Internet, by an Internet Service Provider ("ISP"), which provides Internet access for a typical Internet user. The server 3 is connected to a distributed network 5 such as the Internet or a Wide Area Network ("WAN"), and enables the client 1 to communicate via the distributed network 5.

The client 1 communicates via combination of the server 3 and the distributed computer network 5 to a server 7, such as a communication or an email server. In an exemplary embodiment, the servers 3 and 7 support email services, contain a message storer for holding messages until delivery, and contain a translation facility or gateway for allowing users having different email programs to exchange email. The server 7 is connected to an internal network 9 such as a Local Area Network ("LAN") and enables the client 1 to communicate with the clients 11a, 11b, and 11c via the internal network 9. The clients 11a, 11b, and 11c are not only able to respond to a communication from the client 1, but are also able to initiate communication with the client 1. The clients 11a, 11b, and 11c can send information via the internal network 9 to the server 7. The server 7, in turn, forwards the information to the client 1 via the distributed computer network 5. The information is retrieved by the server 3 and can be forwarded to the client 1 when requested by the client 1.

The client 11, however, need not be a standard computer but any sort of computing appliance. For instance, a Portable Digital Assistant (PDA) such as a Palm Pilot™ will readily be able to send and receive data by the inventive means. The network can be less traditional as well. In, for example, the military context, the network might include an radio frequency link to an Unmanned Combat Air Vehicle. A single control station might be one client 11 using the distributed network 5 to control multiple UCAVs. The inventive method would allow networking securely over the broadcast radio frequencies. Communications will be seamless with data passed through a variety of paths. Wide area 5 and local airborne networks 9 will allow redundancy among the force package and bandwidth sharing to ensure robust connectivity with the control station via line-of-sight, relay extension and/or satellite communications.

Figure 2:
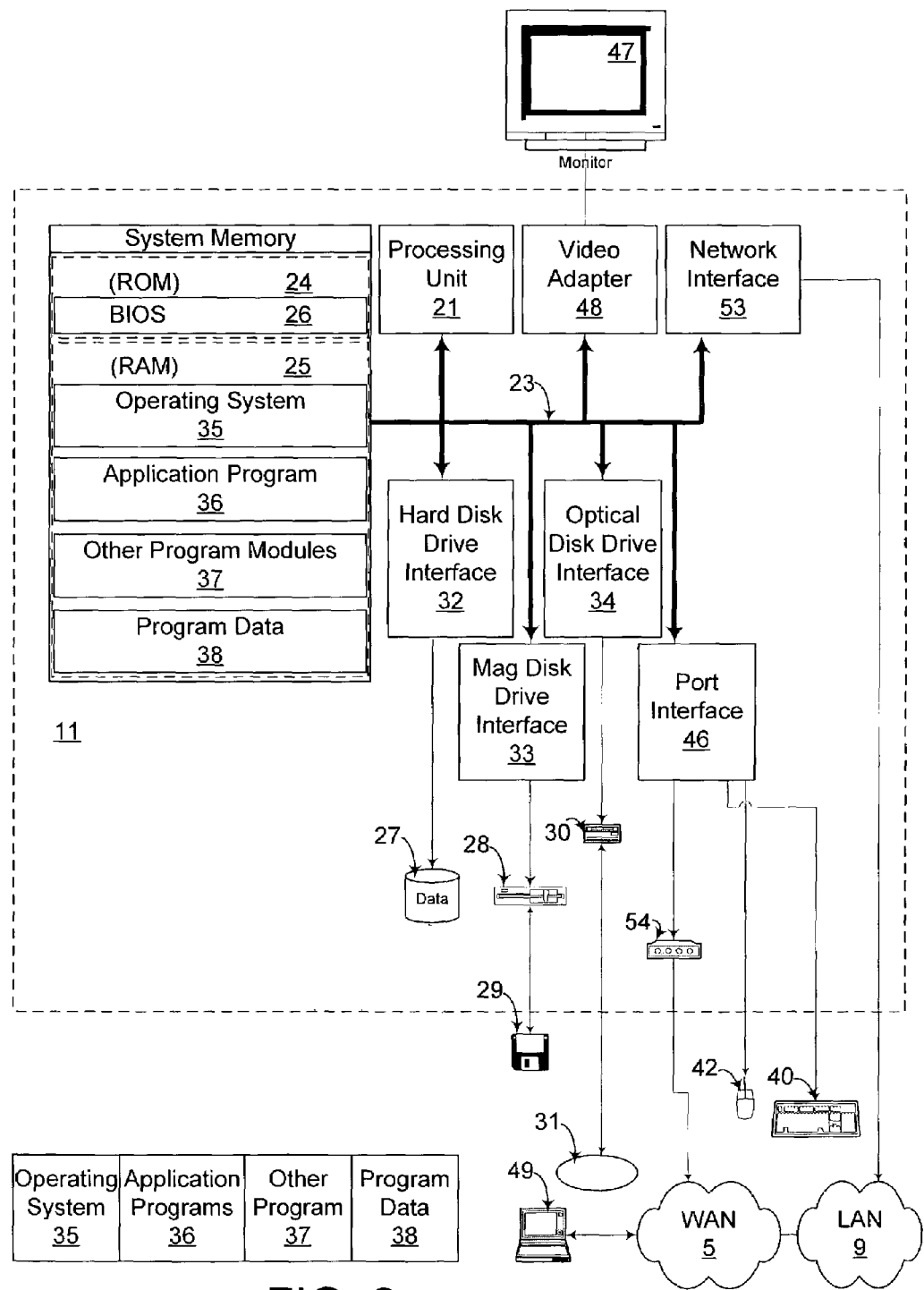
FIG. 2 shows an exemplary client computer on the network displayed in FIG. 1.

With reference to FIG. 2, an exemplary system for implementing the invention includes a conventional personal computer 11, which serves as a client. The client 11 may represent any or all of the clients 1, 11a, 11b, and 11c illustrated in FIG. 1. The client 11 includes a processing unit 21, a memory unit 22, and a system bus 23 that couples the system memory unit 22 to the processing unit 21. The memory unit 22 includes Read Only Memory ("ROM") 24 and Random Access Memory ("RAM") 25. A basic input/output system 26 ("BIOS"), containing the basic routines that help to transfer information between the elements within the client 11 such as during start-up, is stored in the ROM 24. The client 11 further includes a hard disk drive 27, a magnetic disk drive 28, e.g., to read from or write to a removable disk 29, and an optical disk drive 30, example given, for reading a CD-Rom disk 31 or to read from or write to other media. The hard disk drive 27, magnetic disk drive 28, and optical disk drive 30 are connected to the system bus 23 by a hard disk drive interface 32, a magnetic disk drive interface 33, and an optical disk drive interface 34 respectively. The drives and their associated computer readable media provide non-volatile storage for the client 11. Although the description of computer readable media above refers to a hard disk, a removable magnetic disk, or a CD-Rom disk, it should be appreciated by those skilled in the art that other types of media which are readable by computer such as magnetic cassettes, flash memory cards, digital video disks, Bernoulli cartridges, and the like, may also be used in the exemplary operating environment.

A number of program modules may be stored in the drives 27, 28, 29, and 30, and the RAM 25 including an operating system 35, one or more application programs, such as an email program module 36, other program modules, such as a message manager program module 37, a local message store 38, and a database 39 for supporting email applications. A user may enter commands and information into the client 11 through a keyboard 40 and pointing device, such as a mouse 42. Other input devices (not shown) may include a pen, a touch operated device, a microphone, a joystick, a game pad, a satellite dish, a scanner, or the like. These and other input devices are often connected to the processing unit 21 through a port interface 46 that is coupled to the system bus, but may be connected by other interfaces, such as a serial port, a game port, or a Universal Serial Bus ("USB"). A monitor 47 or other type of display device is connected to the system 23 via an interface, such as a video adapter 48. In addition to the monitor, personal computers typically include other peripheral output devices (not shown), such as speakers or printers.

The client 11 operates typically in a networked environment using logical connections to one or more remote computers, such as a remote computer 49. The remote computer 49, need not share the same operating system. The remote computer 49 may be an email server (which includes one or more message stores), as described above in connection with FIG. 1, a file server (which includes one or more file stores), a router, a peer device, or other common network node, and typically includes many or all of the elements described relative to the client 11. The logical connection depicted in FIG. 2 includes communication to either a Local Area Network ("LAN"), or a Wide Area Network ("WAN") 5. Such networking environments are commonplace in offices, enterprise-wide computer networks, intranets, and the Internet. When used in the LAN network environment, the client 11 is connected to the LAN 9 through a network interface 53 or additionally through the WAN 5. When used in a WAN networking environment, the client 11 typically includes a modem or other means for establishing communication over the WAN 5, such as the Internet. The modem 54 which may be internal or external is connected to the system bus 23 via a serial port or interface 46 or other suitable porting means. In a networked environment, program modules depicted relative to the client 11, or portions thereof, may be stored in the remote memory storage device. It will be appreciated that the network connections shown are exemplary and other means of establishing a communications link between the computers may be used.

A socket is a software interface that allows a software program to link to another program in a physical IP network over either a LAN 9 or a WAN 5. Each Transmission Control Protocol/Internet Protocol (TCP/IP) enabled computer has 65,536 sockets available for Transmission Control Protocol (TCP) communication with other hosts. The sockets are really just logical ports, created by software, and all run over the same physical TCP/IP link. By convention, certain socket numbers are assigned to services available on every TCP/IP host. Services such as FTP and TELNET which run over socket 23 are examples of such conventional socket assignments. In general, sockets numbered 1 through 1023 are reserved for TCP/IP host services.

Outside of TCP/IP environment, there exist other conventional means for communicating across environments such as the Local Area Network 9 or the Wide Area Network 5. Common Object Request Broker Architecture ("CORBA") use software wrappers to tie Commercial Off-The-Shelf ("COTS") applications to a common Object Request Broker ("ORB") software interface. One example is Washington University's CORBA-based ACE/TAO software platform known as Boldstroke. Objects on either the client 11a, 11b, or 11c or the server 7 are wrapped in a software interface that allows the COTS program to link to another program within the wide area network 5 or the local area network 9. While sockets and wrappers are not the same thing, they serve analogous functions in different environments.

Those skilled in the art will readily appreciate that while the remainder of the discussion is directed at sockets and placing filters in operation within a socket interface that identically the same rationale would apply to the operating system and software wrappers in a CORBA-based system. The inventive method may be incorporated at any level of the architecture. Operating systems can include the facility to read and write to and from expected sources judging the veracity of the data based upon an anticipated location for the data. Even within a single machine, the locations of data on memory units: RAM 25, Hard Drive 27, Magnetic Disk 29, or Optical Disks 31.

Figure 3:
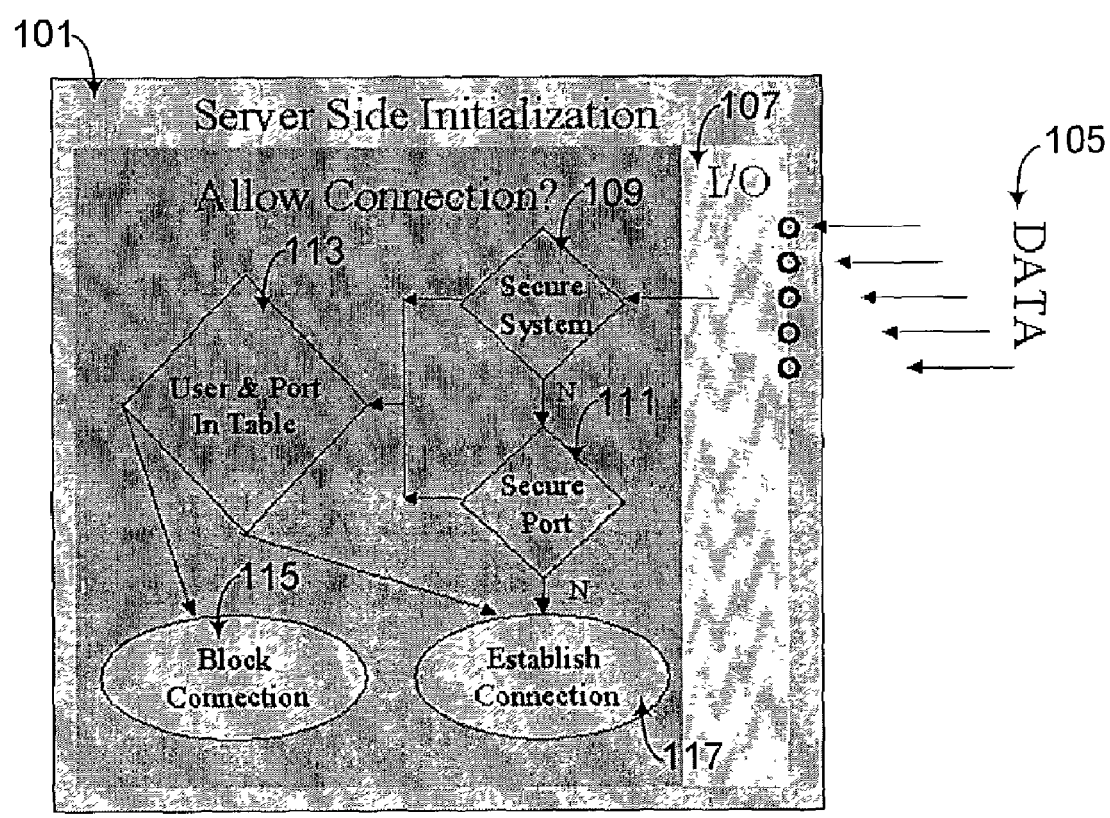
FIG. 3 is a flowchart showing use of the invention on the server side of the network shown in FIG. 1.

Referring now to FIGS. 1–3, the server side initialization 101 is a socket embodiment. FIG. 3 represents a generalized flowchart of the inventive process residing on a server 7 in a network system such as that represented in FIG. 1. The network 5 is presumed to be "open" that is to say that not all links in the network are known to be secure from external access. When the server receives data 105 from the open network 5, the data arrives at an input/output interface 107 and is examined. It is the task of the invention to quickly ascertain whether data is "reliable."

In the distributed network 5, data transfers may be either "secure mode" to protect an entire process or "port secure" to protect only certain communications. Thus, a client 11 might either be looking to establish a communications link with the server 7 that is transient or persistent. The client 11 negotiates a connection with the server 7 for either a secure system or a secure port.

At decision blocks 109 and 111, the server 7 polls the data 105 and, after examining any header that may be included in the data, makes a decision at the decision block 109 that the client is not seeking a secure system, and then examines at the decision block 111 whether the client is seeking to establish a secure port. If the client seeks neither a secure system nor a secure port is necessary, the server 7 establishes a connection at a block 117 with only non-secure functions of the system such a non-secure function without limitation, the corporate splash page for a public Internet presence. If at either of the blocks 109 or 111 the client 11 has requested secure operation, such as, without limitation, by a header to the data 105, secure operation, the inventive process commences at decision block 113.

One means of verifying the identity of data that the inventive method seeks to exploit is examining the source of the data. This is because reliable data comes from expected sources. An analogy to wartime voice communication is used as an illustration to explain this concept. In times of military alertness, military units will switch to frequencies for radio communications that have been agreed to in advance as corresponding to the alertness state. Thus, a pilot of an aircraft reporting an engagement with an enemy on a non-secure frequency would cause the chain-of-command in flight operations to question the validity of the report because it is not on the appropriate frequency. Indeed, the pilot might not be able to raise the chain-of-command on the non-secure frequency simply because this convention has the chain of command listening on alternate frequencies. In an analogous fashion, the server 7 will not accept data purporting to be secure data that comes to it from an IP address on the computer network that is not deemed reliable and appropriate for this user and application.

At a block 113, in one embodiment, the data 105 presented by the I/O interface 107 is examined and scrutinized to see if the data 105 comes from a send site designated by an EP address existing on a look-up table. As in the military analogy, the IP address are treated much as the frequencies for transmission. Just like secure military frequencies might vary from day-to-day or from minute-to-minute, the invention does not require that the IP filter table remain static. Rather, by any suitable algorithm or transmission means IP filter tables may vary as appropriate. Nonetheless, if the send site from which the data 105 originates is not appropriate for the type of application and user designated, the data is rejected at the block 113.

An additional virtue of the present invention is that if, at the block 113, the send site for the data 105 is not appropriate, the system moves to a block 115 to block the connection. If desired, a log may be made of the data 105 and the source IP address, logging the same as an attack on the system. An administrator of the network 5 would thereby use the "attack log" generated to track attacks on the system. Constellations of attacks from a single IP address might indicate either a failure in the system to synchronize IP filter tables containing the "trusted" send site information or the identity of the attacker seeking to "hack" into the system.

In the event that data is sent from an appropriate source, a secure connection is established at the block 117 suitably allowing either allowing secure system or secure port communication depending upon the request in the data header. The connection is established based upon data stemming from an expected source.

Figure 4:
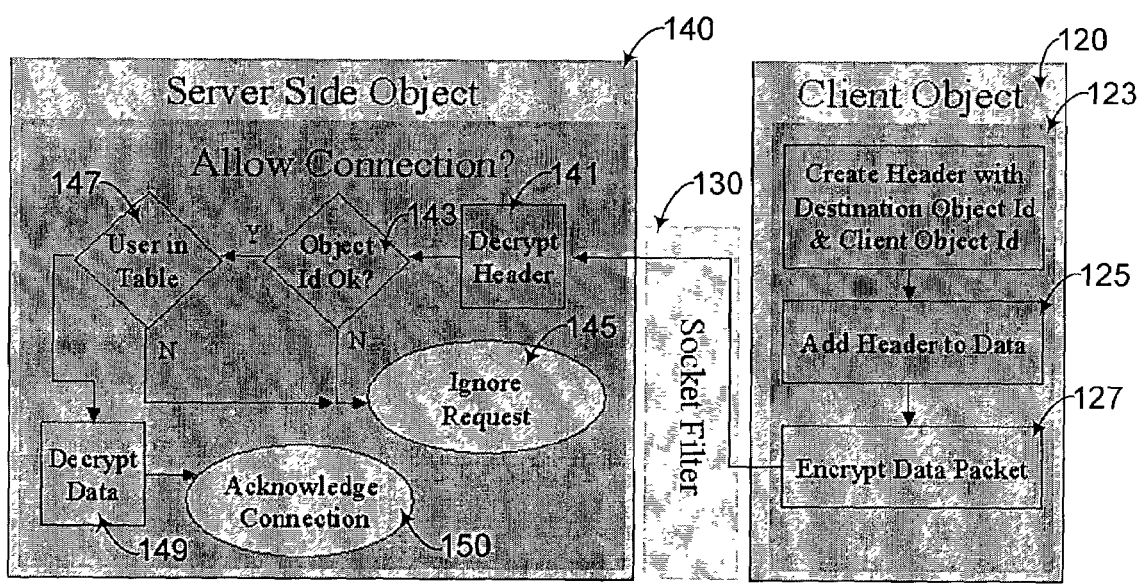
FIG. 4 shows the interaction between the server and the client.

While FIG. 3 portrays the generalized method as a server side socket filtering embodiment, FIG. 4 portrays a server-side object filtering embodiment. The distinction between the two embodiments is the point where the method is interposed. For the server side socket filtering shown in FIG. 3, the model suggests that the boundaries of security are co-terminus with the server, that is to say that the server itself is secure and that the socket is the frontier-checkpoint where the pass/no pass decision is made for data entering the server. FIG. 4, on the other hand, presents server-side object filtering. Secure and non-secure data resides within any server. Each object has a frontier of security drawn around it in the server side object filtering (FIG. 4) such that the frontier checkpoint for security is access to the object itself rather than to the whole of the server.

Referring now to FIGS. 1, 2, and 4, a client object 120 resides on a client computer 11. The client object 120 might be a COTS application wrapped in its appropriate software wrapper or it may be a proprietary object written with definitions consistent with a CORBA architecture. In either case, the object has the ability to read from or write data to the system. In most systems, the client object 120 will have the ability to encrypt data, though encryption is a distinct form of security and is not required by the invention. If encryption is used, the sort of encryption, e.g., 128-bit public key encryption, will not affect the inventive system. However, because the use of encryption provides an elegant overlay to the inventive method, the description of this embodiment includes encryption and decryption at suitable points.

In this example, the client object 120 seeks to transfer data to the server object 140 over the network 5. The process is symmetric. There is no need for the process to originate on the client side; rather, the roles can be exchanged. Nonetheless, FIG. 4 depicts a data transmission from the client 11 to the server 7.

To write data to the server 7, the client object 120 selects data for transfer. Having appropriately defined data that itself comprises either a data set or an object, the client object 120 then selects a system receive site address on the server based upon a first IP address/object filter table and the desired security level. The IP address/object filter table is suitably a "look-up" table that indicates addresses appropriate for reliable transfer of data. The IP address/object filter table may change periodically to enhance security. For any given moment of application, the table is static, because, at any given transmission time, the definition of a trusted send site and a trusted receive site must correlate to allow successful transmission. One presently preferred embodiment of the invention suitably generates filter tables as a result of an algorithm based on date stamp information. In any regard, the first IP address/object filter table represents secure receive sites based upon a given user and application.

At a block 123, the client object, now, defines a data payload including the data in question and a descriptive header. The descriptive header, in turn, includes a destination object ID and client object ID. At a block 125, the destination object ID adds the secure receive site address along with receive object parameters defining the size and attributes of the data in the data payload. Where encryption is used, the data payload is encrypted according to a suitable known technology, at block 127. The encrypted data is now suitable for transfer across the network 5. In some instances, the encrypted data will pass through a filter 130 such as a socket filter. Upon receipt of data, the server side object 140 will decrypt the header at block 141. The decryption at block 141 only decrypts the header of the data payload in order to establish the system receive site address, a send object name, a receive object name, and the receive object parameters. At a block 143, the system compares the decrypted data payload used for the data. In doing so, the inventive method checks to determine that the data has not been corrupted in transmission and each bit of data sent corresponds with each bit of data received. At a block 143, if the values describing the received data payload do not correspond with those encrypted in the header, the data is immediately rejected as corrupt, and at a block 145, the data is ignored.

After this integrity check, at a block 147 the method checks a second IP address/object look-up table, compares the safe send address data for the time of sending and according to the users and applications sending the data to see if the data payload was sent from a suitably secure site. If not, the data is treated as corrupt or dangerous and again, at the block 145, the data is ignored. If it passes both tests, the data payload is entirely decrypted at a block 149 and suitably saved in association with the server side object 140.

One skilled in the art will readily appreciate that the first IP address/object look-up table need not precisely match the second IP address/object look up table. So long as there is a correspondence between the tables such that the sending computer always knows, from the first IP address/object look up table, where the secure receive sites are and the receiving computer knows, from the second IP address/object look up table, where the secure send sites are, the IP address/object filter will work. This enhances security because computers at send sites are not aware of other send sites' secure IP addresses. Thus, no sending computer can masquerade as a distinct sending computer. Each appropriate table can be constructed in manner to prevent possible cross-referencing to anticipate the values of sites around the network for other clients 11 in the network 5.

Figure 5:
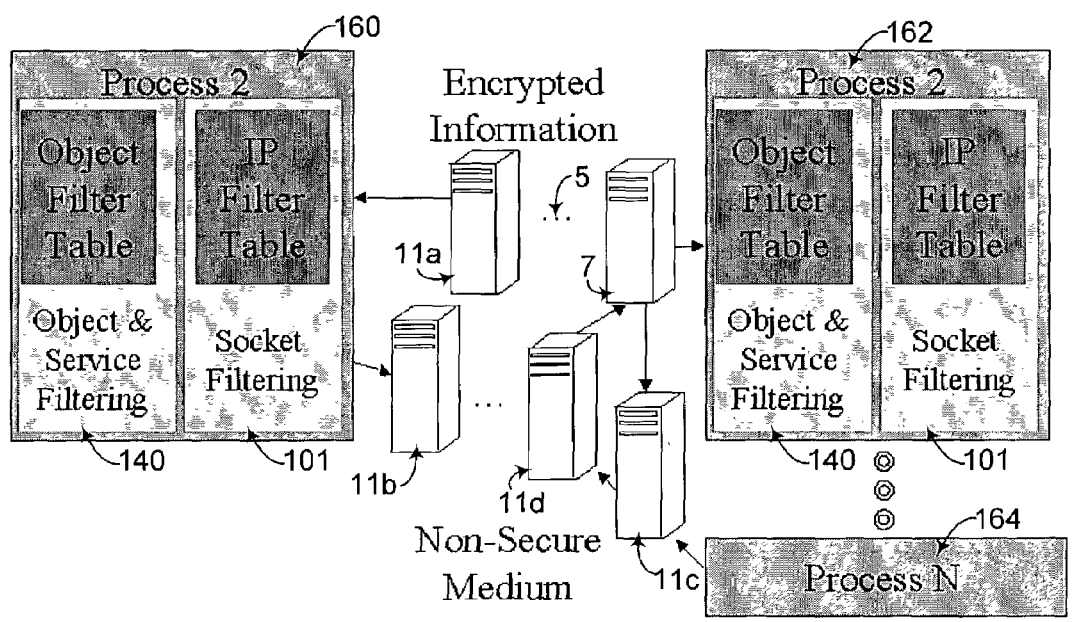
FIG. 5 shows the invention in a peer-to-peer network environment.

Referring, now, to FIG. 5, the role of the several distinct IP address/object filters across the network, one IP object filter is set 160 is implicated in communications between client 11a and Client 11b. Distinct tables are employed in communications between client 11c and 11d, as opposed to using one table for all communications such as from client 11d to server 7 or server 7 to client 11c.

While the preferred embodiment of the invention has been illustrated and described, as noted above, many changes can be made without departing from the spirit and scope of the invention. For example, as discussed above, rather than employing the inventive method in either sockets or software wrappers, the inventive method might in fact be embedded in an operating system. Similarly, the inventive method could be employed in drivers that drive memory devices on the network. Accordingly, the scope of the invention is not limited by the disclosure of the preferred embodiment. Instead, the invention should be determined entirely by reference to the claims that follow.

What is claimed is:

1. A method for securely transferring data between applications over a network comprising:
   selecting a receive site address on a server from a site receive list;
   defining a data payload for transmittal including data for transfer;
   encrypting the data payload; and
   transmitting the encrypted data payload from a send site address selected from a send site list over a network to the receive site address; and
   receiving the data payload at the receive site address based upon its transmission from the send site.

2. The method of claim 1, wherein each of the send site list and the receive site lists are based upon a first IP address/object filter table and a desired security level that is selected from the first IP address/object filter table.

3. The method of claim 2, further comprising:
   receiving the transmitted encrypted data payload over the network at the receive site address;
   decrypting the data payload; and
   accepting the data based upon a second IP address/object filter table and the send site address.

4. The method of claim 1, wherein the data payload includes a data payload header comprising:
   the system receive site address;
   a send object name;
   a receive object name; and
   receive object parameters.

5. The method of claim 4, wherein the receiving includes separately decrypting the data payload header.

6. The method of claim 5, wherein decrypting the data payload header includes accepting the data payload for decryption based upon anticipated values contained in the data payload header.

7. The method of claim 1, wherein either the first or second IP address/object filter tables are changed periodically.

8. The method of claim 1, wherein data is selected for secure transfer according to the predetermined security level.

9. A software product in an object-oriented networked system for secure transfer of data, the software product comprising:
   a first executable wrapper to wrap a first software application including:
      a first program code for accepting data at a send site from the first software application;
      a second program code for selecting a receive site on a network from a first filter table based upon a predetermined level security selected from the first filter table;
      a third program code for encrypting the accepted data from the first software application; and
      a fourth program code for transmitting data from the send site to the selected receive sight; and
   a second executable wrapper to wrap a second software application, the second executable wrapper including:
      a fifth program code for accepting transmitted data from the network at a selected receive site;
      a sixth program code for decrypting accepted data from the network;
      a seventh program code for accepting the decrypted data based upon the send site and a second filter table; and
      an eighth program code for providing decrypted data to the second software application.

10. The software product of claim 9, wherein the second program code assembles the accepted data into a data payload including a data payload header.

11. The software product of claim 10, wherein the data payload header includes:
    the receive site address;
    a send object name;
    a receive object name; and
    receive object parameters.

12. The software product of claim 11, wherein the seventh program code includes the data payload header.

13. The software product of claim 12, wherein the sixth program code decrypts the data payload header by accepting data based upon anticipated values contained within the data payload header.

14. The software product of claim 9, wherein the first and second filter tables are changed periodically.

15. The software product of claim 9, wherein data is selected for secure transfer according to the desired security level.

16. A system for transmitting data objects across a network of computers comprising:
    a network of computers, including at least one server and at least one of client computers;
    a send addressable memory site within the network;
    a receive addressable memory site within the network;
    a first set of executable data located at a first addressable memory site within the network including:
       a first program code for selecting the receive memory site from a first filter table based upon a desired level of security selected from the first filter table;
       a second program code for encrypting a data payload including data for transmittal; and
       a third program code for transmitting the data payload from the send memory site to the receive memory site;
    a second set of executable data located at the receive memory site, the second set of executable data including:
       a fourth program code for accepting the transmitted data payload;
       a fifth program code for decrypting the accepted data payload; and
       a sixth program code for accepting the decrypted data payload based upon the send memory site and a second filter table.

17. The system of claim 16, wherein the data payload further includes a data payload header.

18. The system of claim 16, wherein the data payload header includes:
    the receive site address;
    a send object name;
    a receive object name; and
    receive object parameters.

19. The system of claim 16, wherein the fifth program code further decrypts the data payload header.

20. The system of claim 16, wherein decrypting the data payload header includes accepting data based upon the anticipated value of the data payload header.

21. The system of claim 16, wherein the first and second filter tables are changed periodically.

22. The system of claim 16, wherein the client is an unmanned combat air vehicle.

23. The system of claim 16, wherein the client is a personal digital assistant.

* * * * *